June 7, 1966     N. G. BUDDE     3,254,582
PHOTOGRAPHIC APPARATUS FOR EXPOSING PHOTOSENSITIVE
IMAGE-RECORDING SHEETS
Filed March 26, 1962     3 Sheets-Sheet 1

INVENTOR.
Nau Guthrie Budde
BY Brown and Mikulka
and
Robert E. Corb
ATTORNEYS

3,254,582
Patented June 7, 1966

3,254,582
PHOTOGRAPHIC APPARATUS FOR EXPOSING PHOTOSENSITIVE IMAGE-RECORDING SHEETS
Nan Guthrie Budde, Teaneck, N.J., assignor to Polaroid Corporation, Cambridge, Mass., a corporation of Delaware
Filed Mar. 26, 1962, Ser. No. 182,403
3 Claims. (Cl. 95—13)

This invention relates to photographic apparatus and particularly to novel and improved apparatus for exposing photographic image-recording sheet material which is treated to produce photographic prints.

A widely practiced method of producing photographic transfer prints entirely within a camera involves a so-called "dry" process in which a processing liquid is distributed between an area of photographic image-recording sheet exposed to produce an image in said area and an image-receptive sheet designed to support a transfer image comprising image-forming substances formed by reaction of the processing liquid with the photosensitive material of the image-recording sheet and then transferred by diffusion to the image-receptive sheet. Photographic prints customarily comprise a rectangular image surrounded by a blank, image-free border, on a rectangular sheet large enough to accommodate the image and border. When producing such prints by a diffusion transfer process, it has been the practice to employ image-recording and image-receiving sheets of approximately the same width and at least equal in width to one dimension of the print including the border. An area of the image-recording sheet, slightly larger than the desired transfer image, is exposed to produce an image in the area. The image-recording sheet is then superposed with an image-receptive sheet and the processing liquid is distributed between and in contact with an area of the image-recording sheet including the exposed area and a corresponding area of the image-receptive sheet. The border around the transfer image is achieved by providing a masking layer, usually a separate sheet, between the image-recording and image-receptive sheets for preventing transfer of image-forming substances from the image-recording sheet to those areas of the image-receptive sheet which comprise the border. The processing liquid is supplied between the sheets in a mass located adjacent a transverse edge of the exposed area of the image-recording sheet and is distributed from the mass between the sheets by moving the sheets in superposition, relative to and between a pair of juxtaposed members. Following distribution of the processing liquid, the sheets are retained in superposition for a predetermined period during which transferable image-forming substances are produced from photosensitive material (usually unexposed) in the image-recording sheet and are transferred by diffusion to a layer on the image-receptive sheet to form a transfer image (usually a positive) on the image-receptive sheet. The masking sheet may not only function to provide the borders, but it may also cooperate in determining the thickness of the layer of liquid distributed on these sheets and it may aid in confining the liquid between the edges of the sheets.

This method of producing photographic prints is, in some respects, inherently wasteful and unnecessarily expensive. Specifically, the lateral marginal portions of the image-recording sheet outside of the image areas and the processing liquid distributed between these portions and the image-receptive sheet, do not enter into image formation; and, in fact, necessitate the masking sheet which, in itself, represents a component the elimination of which would materially reduce the cost of each print produced. In the copending U.S. application Serial No. 182,354, filed on even date herewith (and now abandoned) it is suggested that a substantial savings of materials and cost of assembly of the film can be achieved by eliminating the mask between the image-recording and image-receptive sheets and employing an image-recording sheet which is substantially equal in width to the width of the image being produced. While this method insures well-defined lateral borders on each print, when a succession of prints are to be made on a single image-receptive sheet from a succession of exposed areas of a single image-recording sheet, means must be provided for producing the image-free borders at the ends of the prints, i.e., image-free areas between successive images. This operation was heretofore the function of the mask and points up another advantage of mask elimination which is the elimination of the problems associated with locating predetermined areas of the image-recording sheet in position for exposure and then registering these areas with the mask so that the transfer images are formed within the borders defined by the mask.

Objects of the invention are: to provide, in photographic apparatus for exposing a succession of areas of a photosensitive image-recording sheet which is thereafter treated in conjunction with a second sheet to produce a succession of transfer images on the second sheet, novel and improved means for exposing the image-recording sheet in the spaces intermediate pairs of the first-mentioned areas so as to preclude subsequent formation of transferable image-forming substances in the spaces and thereby produce an image-free border at the trailing edge of one transfer image and the leading edge of the next succeeding transfer image; and to provide in apparatus as described, means for positioning successive areas of the image-recording sheet for exposure, and on a single means for exposing the image-recording sheet at one end of an area positioned for exposure for producing two end borders, each on one of two adjacent transfer images.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
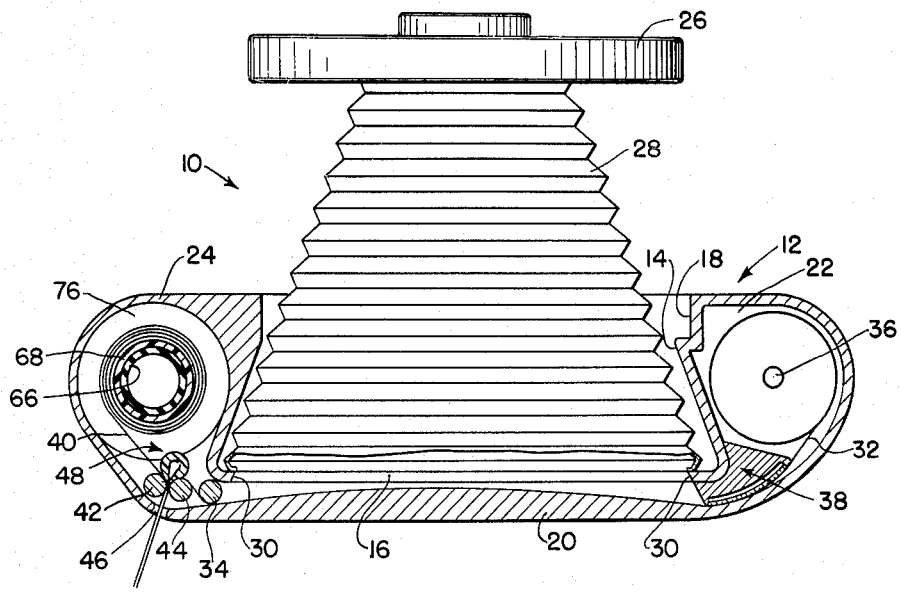
FIGURE 1 is a somewhat schematic view, partially in section, of photographic apparatus in the form of a camera incorporating the invention.
Figure 2:
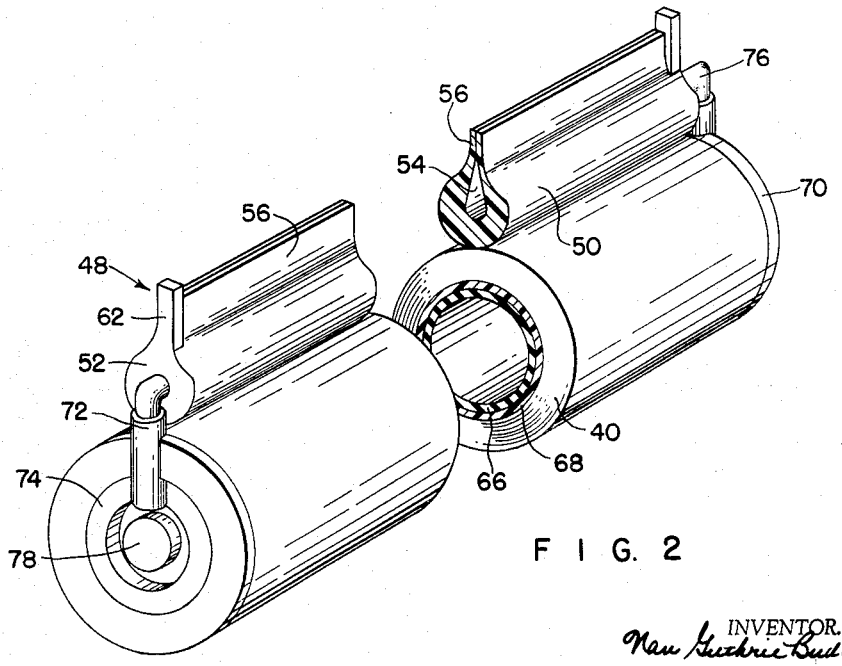
FIG. 2 is a perspective view partially in section of components of the apparatus of FIGURE 1.

Reference is now made to FIGURE 1 of the drawings wherein there is illustrated photographic apparatus in the form of a small, compact, hand-held camera 10 of a type incorporating the invention. Camera 10 comprises a housing including a forward wall 12 having a recessed or re-entrant section 14 extending rearwardly to an inner forward wall 16, side walls 18 and a rear wall 20. The walls of the housing cooperate to provide chambers designated 22 and 24 at opposite ends of the housing and an exposure chamber located between inner forward wall 16 and rear wall 20. Camera 10 includes a conventional lens and shutter assembly designated 26 coupled to the camera by a bellows 28 joined to assembly 26 and to inner forward wall 16 around the edges of an aperture 30 provided in inner wall 16 for transmitting light from the lens to a photographic image-recording sheet positioned within the exposure chamber between inner forward wall 16 and rear wall 20. The bellows and the camera housing may be constructed as shown so that the shutter assembly can be displaced from the extended operative position shown in FIGURE 1 to a folded or closed position at which the bellows is collapsed within the recess described.

In the operation of camera 10, a supply of a photographic photosensitive image-recording sheet material of a conventional type comprising, for example, a gelatino silver halide emulsion carried on a flexible support, is stored in chamber 22. This photosensitive image-recording sheet, herein designated 32, is preferably supplied in a coiled condition on a spool 36 which is mounted for rotation within chamber 22. Sheet 32 extends from chamber 22 to the rear of wall 16 between the latter and rear wall 20 across exposure aperture 30 to chamber 24 at the opposite end of the camera housing.

As previously indicated, the image-recording sheet has a width which is substantially equal to the width of the image to be formed on the sheet by exposure thereof in the camera; and for this reason, provision is made for supporting the image-recording sheet in position for exposure by means located behind the image-recording sheet and which do not interfere with exposure of the sheet to its lateral edges. These means comprise the inner forward surface of rear wall 20 which is positioned so that an area of the image-recording sheet, held against the forward surface of the rear wall, will be positioned with the forward surface of the sheet at approximately the image surface of the lens. The forward wall is convexly curved toward the lens, and means are provided for applying tension to a section of image-recording sheet extending across the curved surface of the inner wall. The inner surface of rear wall 20 is substantially cylindrical and the curvature is preferably slight (i.e., its diameter is large) so that the forward surface of the photosensitive sheet is not displaced so far out of the image surface (usually a plane) of the lens as to cause more image distortion than can be tolerated. For example, in an embodiment of the camera in which the diagonal dimension of the image is approximately 4½ inches, the center of the forward surface of rear wall 20 may be displaced approximately .050 of an inch forward of the rearmost portion of the forward surface of the rear wall. The means for applying tension to the photosensitive sheet to retain it against rear wall 20 include a guide roll 34 located adjacent rear wall 20 at the entrance to chamber 24 and an exposure means 38, to be described fully hereinafter, disposed at the opposite end of the exposure chamber at the entrance to chamber 22.

The photosensitive image-recording sheet is exposed to its lateral edges and is treated following exposure with a fluid distributed between the image-recording sheet and a second or image-receptive sheet superposed therewith. A supply of this second sheet, designated 40, is provided within chamber 24 together with means in the form of a pair of juxtaposed members for superposing the photosensitive and second sheets and aiding in the distribution of a processing liquid in a layer between the sheets. In the form shown, the juxtaposed members comprise a pair of pressure-applying rolls 42 and 44 mounted in juxtaposition within chamber 24 adjacent guide roll 34 near the entrance to the exposure chamber between wall 16 and rear wall 20. Photosensitive sheet 32 is guided from spool 36 within chamber 22 between exposure means 38 and the inner surface of rear wall 20, through the exposure chamber, between guide roll 34 and rear wall 20, and around pressure-applying roll 44 between rolls 42 and 44 toward the rear of the housing. Second sheet 40 extends within chamber 24 into superposition with image-recording sheet 32 at the bite of rolls 42 and 44 and extends in superposition with the image-recording sheet between the pressure-applying rolls. A withdrawal passage 46 is provided in rear wall 20 in alignment with the gap between rolls 42 and 44 to permit withdrawal of sheets 32 and 40 from the housing. The sheets, as shown, are guided along convergent paths into superposition at the bite of the pressure-applying rolls, and it is between the convergent portions of the sheets at the bite of the rolls that the fluid-processing composition is introduced.

Image-recording sheet 32 is substantially equal in width to the width of the image to be produced, and roll 44 includes a cylindrical pressure-applying surface substantially equal in length to the width of sheet 32. The camera is designed to produce a succession of rectangular photographic prints each comprising a rectangular transfer image supported on sheet 40 and surrounded by a sharply defined image-free border. The width of the image-receptive sheet accordingly is equal to the combined widths of the image and the lateral borders, and roll 42 includes a pressure-applying surface which is at least equal in length to the width of image-receptive sheet 40. The pressure-applying rolls are so positioned with respect to one another and the other components of the camera that the lateral edges of the image-receptive sheet coincide with the ends of the pressure-applying surface of roll 44; and the lateral marginal portions of sheet 40 extend equal distances beyond the ends of the pressure-applying surface of roll 44 and the lateral edges of sheet 32.

The transfer image comprising each positive print is preferably formed by a diffusion-transfer reversal process in which reagents in a liquid distributed between the image-recording and image-receptive sheets react with the photosensitive material to produce image-forming substances which are transferred by diffusion to a layer on the image-receptive sheet. Typical of such processes is silver halide diffusion-transfer reversal in which the liquid includes a silver halide developer and a silver halide solvent which react with unexposed silver halide of the image-recording sheet to form a soluble silver complex which diffuses to an image-receptive layer on sheet 40 where it is reduced to metallic silver to form a visible positive image. For further examples of processes and materials of this type, reference may be had to U.S. Patents Nos. 2,543,181, issued February 27, 1951, and 2,662,822, issued December 15, 1953, both in the name of Edwin H. Land. The apparatus is designed for use in producing prints by diffusion-transfer processes characterized by the fact that no image-forming substances, and this includes dyes and dye intermediates in addition to soluble silver complexes, are formed in or are transferred from the exposed areas of the photosensitive image-recording sheet.

The apparatus includes means in the form of a nozzle 48 for dispensing the processing liquid as a layer located between sheets 32 and 40 and extending to the edges of image-recording sheet 32. The liquid is dispensed at the bite of the pressure-applying rolls and means are also provided for holding a supply of the processing liquid, delivering the liquid to the nozzle under pressure and supporting the nozzle in proper position to perform its liquid-dispensing function. Nozzle 48 is preferably formed of material which is impervious to the liquid and to air, and is flexible and resilient. Various organic plastics and rubber are suited for this purpose and include, for example, high density polyethylene, polypropylene, polyvinylidene chloride, and polyethylene terephthalate resins. The nozzle includes an elongated and generally cylindrical body 50 having end walls 52 cooperating with the body to define an elongated chamber 54, approximately equal in length to the width of the image-recording sheet. Body 50 includes a pair of elongated lips 56 extending from end to end of the body and defining therebetween a tapered passage 58 connecting with chamber 54. Lips 56 taper in thickness toward their longitudinal edges to provide edge portions which are relatively thin and flexible and cooperate to define an elongated discharge mouth 60 at the edges of the lips. Discharge mouth 60 is substantially equal in length to the width of the image-recording sheet and the material comprising lips 56 and their construction are such that mouth 60 can be sealed by the application of compressive pressure at the edge portions of the lips.

Figure 3:
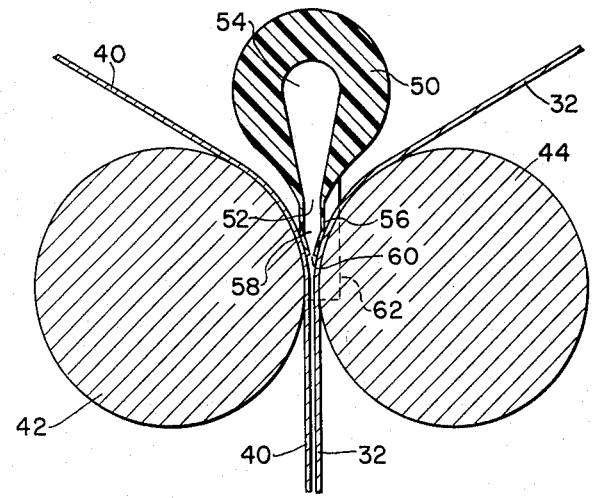
FIGS. 3 and 4 are enlarged sectional views of portions of the apparatus of FIGURE 1 showing in detail the construction and operation of these portions.

The operation of the nozzle in dispensing a processing liquid between the convergent portions of the sheet at the bite of the rolls is illustrated in FIG. 3 of the drawings. Nozzle 48 is located with lips 56 extending toward the bite of the roll between convergent portions of sheets 32 and 40 with the outer surfaces of the edge portions of the lips located in face-to-face contact with the facing surfaces of the sheets. The processing liquid is supplied to the nozzle, specifically to chamber 54, under pressure sufficient to cause the liquid (which may be quite viscous) to flow through tapered passage 58 to discharge mouth 60 where it is dispensed as a layer between the sheets as the sheets move past and in contact with the lips. The movement of the liquid through tapered passage 58 together with the pressure exerted on liquid combine to press the outer surface of the lips against the surfaces of the sheets forming a liquid-tight seal between the lips and the sheets which seal also prevents air from entering between the sheets and lips.

During distribution of the processing liquid, mouth 60 extends to the edges of image-recording sheet 32 so that the layer of liquid also extends to the edge of the sheet as the layer is being dispensed. Means are provided for properly locating the nozzle (mouth) with respect to roll 44, for guiding sheet 32 betweene the rolls and past the nozzle with the edges of sheet 32 in alignment with the ends of the mouth and the end edges of the pressure-applying surface of roll 44, and for preventing the liquid from escaping from between the superposed sheets at the edges of sheet 32 as the liquid is being distributed. In the form shown, these functions are performed by means comprising members 62 on the ends of nozzle 48. Members 62 comprise flanges or extensions of end walls 52 which project perpendicularly beyond the surface of the one of lips 56 which engages sheet 32, so as to provide walls extending outside of the edges of sheet 32 and the ends of the pressure-applying surface of roll 44 for engaging the edges of sheet 32. Each member 62 also extends in the direction of flow of the liquid through mouth 60 beyond the longitudinal edges of lips 56 so as to prevent the lateral flow of the liquid as it is discharged through the mouth and distributed between the sheets by pressure of the rolls. The surfaces of members 62 that face sheet 40 are flush with the outer surface of the lip 56 which contacts sheet 40 for bearing against marginal portions of sheet 40 outside of the lateral edges of sheet 32. Members 62 by virtue of their construction function as guides for positioning the lips of the nozzle and the mouth relative to sheet 32 and roll 44 and guiding the sheet around roll 44 in proper position with respect to discharge mouth 60, in addition to preventing escape of the fluid from between the sheets at the lateral edges of sheet 32.

The processing liquid is supplied and stored under pressure in a container 66 held in a tube 68 around which sheet 40 is coiled. Tube 68 is provided with flanges 70 at its ends for aligning the convolutions of sheet 40 coiled around the tube. The processing liquid is conducted from container 66 to chamber 54 of nozzle 48 through a tubular conduit 72 extending from an end member 74 engaged with tube 68. Conduit 72 and a support member 76 connected between the opposite end of the nozzle and flange 70, function to mount nozzle 48 on tube 68 and position the nozzle with respect to pressure-applying rolls 42 and 44. For details of the construction and manner of operation of container 66 and the assemblage which it comprises, reference may be had to the copending U.S. patent application of Edwin H. Land, Serial No. 169,264, filed January 29, 1962 (and now abandoned). End member 62 includes a centrally located raised section 78 which may be depressed to actuate a valve (described in detail in the last-mentioned application) which controls the flow of liquid under pressure from container 66 to nozzle 48.

During distribution of the processing liquid the nozzle and pressure-applying rolls are located relative to one another in the operative of liquid-spreading position shown in FIG. 3 at which the maximum width of the convergent gap between the rolls at the narrowest portion of the gap is fixed and is approximately equal to the combined thickness of the two sheets and the thickness of the layer of liquid to be distributed between the sheets. Lips 56 extend between convergent portions of the sheets to a position at the narrowest portion of the gap so that the width of discharge mouth 60 is substantially equal to the thickness of the layer of liquid. The processing liquid, as previously indicated, may be quite viscous having a viscosity at 24° C. in excess of 1000 centipoises and ranging from 1000 to 200,000 centipoises, so that the layer of liquid retains its integrity as a layer as it is being dispensed while the viscosity adding material, for example sodium carboxymethyl cellulose, functions to adhere the sheets to one another to form a sandwich.

Movement of the sheets through the apparatus and between the pressure-applying rolls may be accomplished, for example, by manually engaging portions of the superposed sheets extending from between the rolls through the withdrawal passage 46 and applying tension to the sheets for advancing the sheets. The material comprising the sheets may be opaque to actinic light so that the sheets can be withdrawn directly from between the rolls into the light before processing has advanced to the extent that the image-recording sheet is no longer light sensitive. In the operation of camera 10 an area of image-recording sheet 32 is positioned for exposure on the support surface of rear wall 20 in alignment with aperture 30, is exposed and is then advanced into superposition with a corresponding area of second sheet 40 between pressure-applying rolls 42 and 44 while the processing liquid is distributed from nozzle 48 through mouth 60 in a thin layer between the sheets; and the sandwich thus formed is advanced through passage 46 from the camera until the exposed area has been drawn between the pressure-applying rolls. Movement of the sheets is then discontinued to permit the next succeeding area of the photosensitive sheet to be exposed and the portion of the sandwich comprising the previously exposed area of the image-recording sheet may be severed from the remainder of the sandwich extending between the pressure-applying rolls. The diameter of roll 44 is preferably quite small as is the diameter of roll 34 and the distance between roll 44 and the edge of the leading end of the area positioned for exposure so that the space between successive exposed area of sheet 32 can be maintained at a minimum and is preferably equal to twice the width of the borders to be provided at the ends of the prints.

Figure 4:
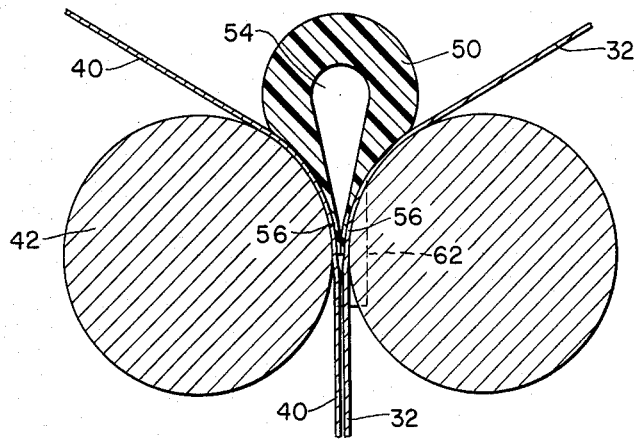

When the apparatus is not being employed for distributing the processing liquid between the sheets and the sheets are not being advanced between the pressure-applying rolls, the rolls are moved to an inoperative or nozzle-sealing position shown in FIG. 4 at which the rolls compress the lips of the container toward one another so as to seal mouth 60. The sealing action of the rolls involves movement of the rolls in a direction opposite to the direction of movement of the sheets between the rolls so that at least the edge porions of lips 56 are located within the bite of the roll near the narrowest portion of the gap between the rolls. As the rolls are displaced from the liquid-spreading to the sealed position in a direction opposite to the direction of movement of the sheets and toward the nozzle, the lips are required to remain substantially stationary and are retained in position by body section 50 of the nozzle which is made substantially rigid so as to function as a support for the lips during movement of the rolls into sealing position.

The camera includes a mechanism (not shown) for operating the valve between container 66 and nozzle 48 for controlling the flow of the processing liquid from the container to the nozzle and to shift the pressure-applying rolls between their operative and nozzle-sealing positions as required to effect spreading of the liquid during movement of the sheets and sealing of the lips when movement of the sheets is discontinued. A number of different mechanisms are available for mounting the pressure-applying rolls and performing these functions, operated for example, by rotation of roll 34; and suitable mechanisms are described in detail in the aforementioned application Serial No. 169,264. Such mechanisms would also include means for automatically arresting the movement of the sheets each time a predetermined length of the image-recording sheet has been advanced through the apparatus.

Employment of an image-recording sheet which is equal in width to the transfer image comprising the finished prints results in image-free, well-defined lateral margins on the prints. Other means, however, must be provided for producing the end margins on the prints and these means comprise means for completely exposing the photosensitive material of the image-recording sheet in the spaces between the areas of the image-recording sheet which are photographically exposed to produce images. By "complete exposure" of the photosensitive material it is meant that the photosensitive material is exposed to an extent that image-forming substances cannot be transferred from the photosensitive material thus exposed, transfer being precluded by the fact that either formation of image-forming substances is made impossible by the exposure or the image-forming substances are immobilized in exposed areas.

These means, in the form shown in FIGURE 1, comprise an exposure means 38 for exposing the space between the image areas of sheet 32 during periods when sheet 32 is at rest with an area thereof in position of exposure. Exposure means 38 may take the form of a low level source of light actinic to the photosensitive material of the image-recording sheet. The level of light emitted by the source may be such that the light emitted is insufficient to fog the photosensitive material during movement of the image-recording sheet past the source, yet of sufficient intensity to cause a complete exposure of the photosensitive material during periods when the image-recording sheet is not in movement. By an exposure insufficient to cause fogging, it is meant that the exposure is insufficient to produce an image (either visible or latent and developable) in the photosensitive material. The actinic radiation for exposing the photosensitive material may be in either the visible or invisible wavelength ranges or may be penetrative radiation emitted by a radioactive source. The sources of such radiation may include radioactive materials capable of producing radiations actinic to the photosensitive material or sources for producing light in the visible wavelength ranges. As a source of light, the camera may also include means for transmitting environmental light from the outside of the camera housing to the film, electrical means for emitting light, or luminescent materials excited by radioactive materials.

Figure 6:
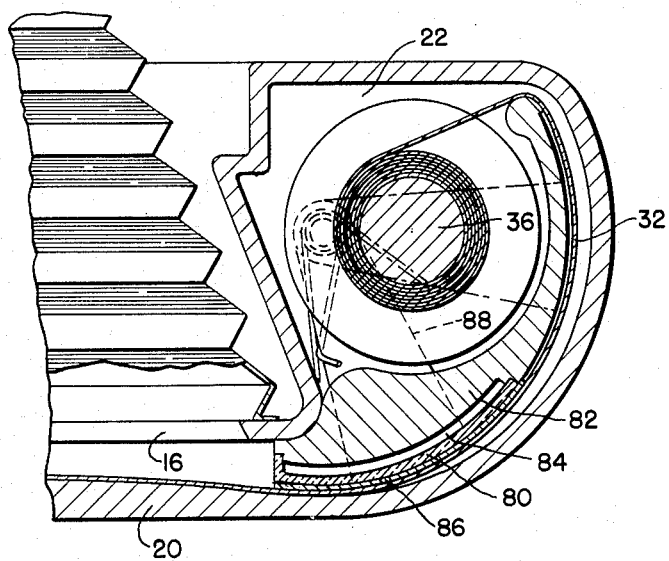

Exposure means 38 shown in FIGURE 1 and the exposure means shown in FIG. 6 are of this last-mentioned type and comprise a curved light-transmitting window 80 located within chamber 22 adjacent rear wall 20 and coated on its inside surface with a luminescent material excited, for example, by beta radiation to emit light actinic to the photosensitive material. Window 80 is mounted on a support member 82 formed, for example of metal, to provide a recessed surface spaced from and substantially parallel with the inner surface of the window and cooperating with the window to provide a chamber 84 underlying the window and filled with a radioactive material such as tritium, for exciting the phosphor coating on the inside of the window. The exposure means shown in FIGURE 1 is of the low level type adapted to completely expose the photosensitive material only when the photosensitive material is held stationary with respect to the exposure means. The exposure means shown in FIG. 6 is of the type having an intensity which is not so limited and accordingly is provided with a cover for preventing exposure of the photosensitive material during movement of the image-recording sheet past the exposure means. In the form shown in FIG. 6, support 82 extends within chamber 22 toward the forward wall of the housing and provides an elongated cylindrical guide surface for supporting the image-recording sheet. A cover element 86 conforming to window 80 and providing an opaque covering for window 80, is mounted on arms 88 for pivotal movement in a counterclockwise direction (viewing FIG. 6), from the covering position shown in which it covers window 80 and prevents exposure of the image-recording sheet, to a second or uncovering position at which the window is uncovered. Cover element 86 is biased by resilient means (not shown) to the uncovering position and is moved into covering position in response to movement of the image-recording sheet in frictional engagement with the cover element. The bias of the aforementioned resilient means is insufficient to resist the movement of element 86 into covering position during movement of the image-recording sheet so that window 80 is covered during movement of the image-recording sheet; but the bias of the resilient means is sufficient to move the cover element into uncovering position when the image-recording sheet is not in motion.

Figure 5:
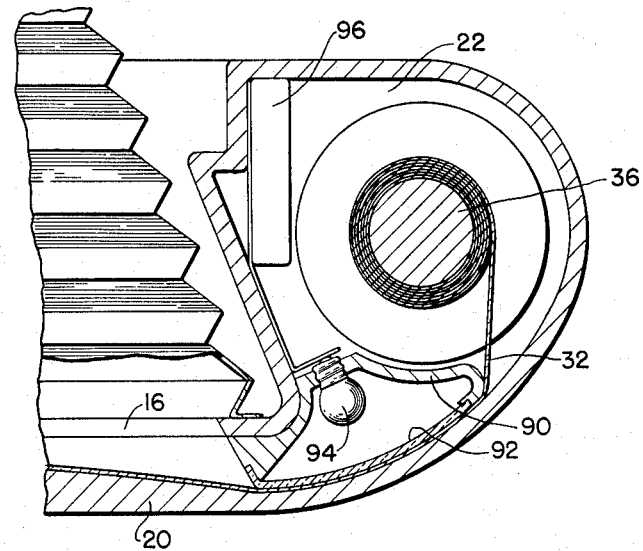
FIGS. 5 and 6 are enlarged sectional views of a portion of FIGURE 1 illustrating in detail various embodiments of the invention.

Another form of exposure means is shown in FIG. 5 and comprises a housing 90 and a curved transparent window 92 positioned adjacent rear wall 20 within chamber 22. Mounted within housing 90 behind window 92 is a lamp 94 connected to a source of current such as a battery 96 also mounted in chamber 22 and a switch (not shown) is provided coupled, for example, with the shutter of the camera for closing the circuit between the lamp and battery to flash the lamp and expose the image-recording sheet when the shutter is actuated to make an exposure. Other exposure means may include means for conducting environmental light into the camera housing from exterior of the camera and may also include means such as a shutter coupled with shutter assembly 26 for exposing the image-recording sheet when shutter 26 is actuated to make an exposure which occurs, of course, when the image-recording sheet is at rest.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including guide means for locating successive areas of a photosensitive image-recording sheet in position for exposure and processing means for superposing said areas of said image-recording sheet with a second sheet and distributing a processing fluid between said sheets to produce a succession of photographic prints each comprising a section of said second sheet carrying an image, consisting of image-forming substances formed from unexposed photosensitive material in one of said areas and transferred therefrom by diffusion to said second sheet, surrounded by a blank, image-free border, in combination:

first exposure means for photoexposing one of said areas of said image-recording sheet positioned for exposure within said apparatus to produce an image in said one area; and second exposure means for so exposing a portion of said image-recording sheet at the trailing end of said one area between the latter and the next succeeding area as to prevent subsequent transfer of image-forming substances from said portion of said image-recording sheet to said second sheet, said portion of said image-recording sheet exposed by said second exposure means extending from said trailing edge of said one area to the leading edge of said succeeding area and having a width at least equal to twice the width of said image-free borders to be formed at the ends of said images;

said second exposure means including a source of radiation actinic to said image-recording sheet and means responsive to movement of said image-recording sheet for preventing said radiation from reaching said image-recording sheet during movement thereof.

2. In photographic apparatus for exposing a succession of areas of a photosensitive image-recording sheet between intermittent movements of said sheet through said apparatus as a step in a process in which said sheet is thereafter treated in conjunction with a second sheet to produce a succession of photographic transfer prints each comprising a transfer image, consisting of transferred image-forming substances formed from unexposed photosensitive material in said areas, surrounded by a blank image-free border, in combination:

means for photoexposing predeterminedly spaced areas of said image-recording sheet, positioned for exposure within said apparatus to produce an image in each of said areas; and means for so exposing a space between the trailing end of one of said areas positioned for exposure and the next succeeding area as to prevent subsequent transfer of image-forming substances from said space to said second sheet, said space having a width at least equal to twice the width of image-free borders to be formed at the ends of said images;

said means for exposing said space comprising a source of radiation actinic to said image-recording sheet and means responsive to movement of said image-recording sheet for preventing said radiation from reaching said image-recording sheet during movement thereof.

3. In photographic apparatus for exposing a succession of areas of a photosensitive image-recording sheet which are thereafter treated in conjunction with a second sheet to produce a succession of photographic transfer prints each comprising a section of said second sheet carrying an image, consisting of image-forming substances formed from unexposed photosensitive material in one of said areas and transferred therefrom by diffusion to said second sheet, surrounded by a blank, image-free border, said apparatus comprising, in combination:

storage means for holding a supply of said image-recording sheet, including a plurality of said areas, in a light-free environment;

guide means for locating one of said areas of said image-recording sheet in position for exposure;

processing means for superposing said image-recording sheet with said second sheet and distributing a processing fluid between said sheets to produce said photographic prints;

first exposure means for photoexposing said one area of said image-recording sheet to produce an image in said one area; and second exposure means located between said storage means and the trailing edge of said one area for so exposing a portion of said image-recording sheet between said trailing edge of said one area and the leading edge of the next succeeding area as to prevent subsequent transfer of image-forming substances from said portion of said image-recording sheet to said second sheet, said portion of said image-recording sheet exposed by said second exposure means having a width at least equal to twice the width of said image-free borders to be formed at the ends of said images;

said second exposure means including a source of radiation actinic to said image-recording sheet and means responsive to movement of said image-recording sheet for preventing said radiation from reaching said image-recording sheet during movement thereof from said storage means into position for exposure.

References Cited by the Examiner

UNITED STATES PATENTS

| | | | |
|---|---|---|---|
| 2,483,014 | 9/1949 | Land | 95—13 |
| 2,524,941 | 10/1950 | Taylor | 95—77 |
| 2,674,532 | 4/1954 | Pierce | 96—29 |
| 2,891,443 | 6/1959 | Pollock | 88—24 |
| 2,966,103 | 12/1960 | Ericson | 96—29 X |

FOREIGN PATENTS 727,353  11/1942  Germany.

JOHN M. HORAN, *Primary Examiner.*

NORTON ANSHER, *Examiner.*